July 19, 1966   R. B. P. CRAWFORD ET AL   3,262,106
GASEOUS HAZARD DETECTOR SYSTEM AND APPARATUS
Filed Jan. 21, 1963
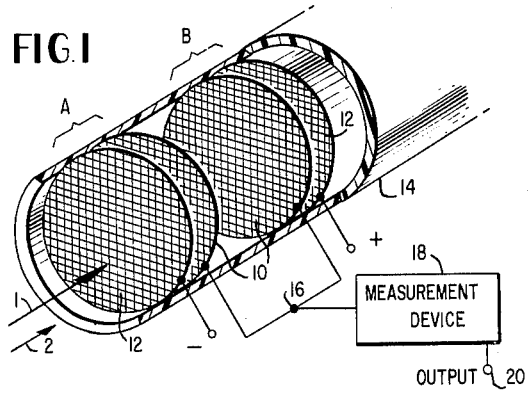
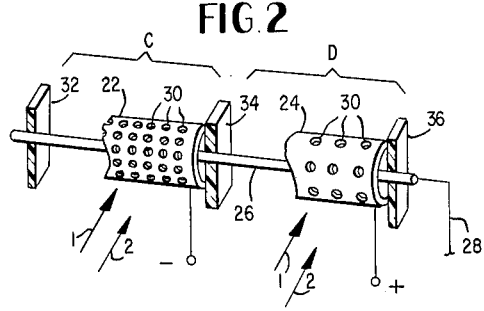
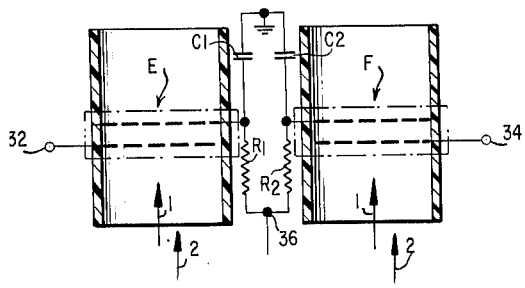
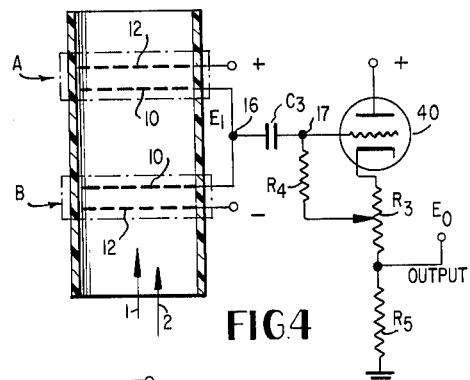
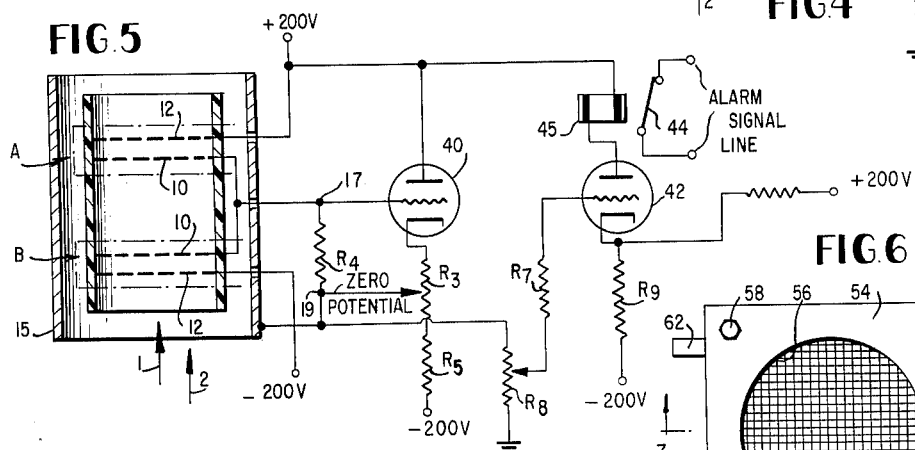
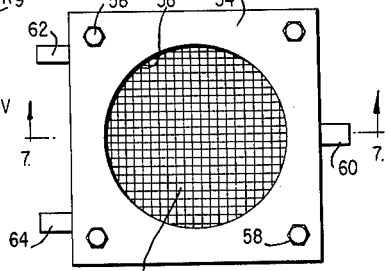
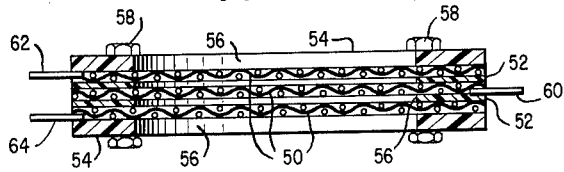
INVENTORS
ROBERT B.P. CRAWFORD
MARK HUROWITZ
BY
Theodore Bishoff
ATTORNEY

United States Patent Office 3,262,106
Patented July 19, 1966

3,262,106
GASEOUS HAZARD DETECTOR SYSTEM
AND APPARATUS
Robert B. P. Crawford, 5102 Beachcomber, Oxnard, Calif.,
and Mark Hurowitz, 773 Christine Drive, Palo Alto,
Calif.
Filed Jan. 21, 1963, Ser. No. 252,902
10 Claims. (Cl. 340—237)

This invention relates to a method and apparatus for detection of fire, radiation, chemical and other hazards, and more particularly, to improved means for sensing smoke and other combustion products of a fire at an incipient, or earlier stage.

Known systems for detecting fire employ a plurality of ionization chambers, usually including ray emitting materials to increase the ionization effect thereof, one of said chambers normally being closed and acting as a reference chamber while the other chamber is open to the environment to be measured. Changes in the ionization measured in the open chamber with respect to the fixed ionization level of the reference chamber are compared and the resultant potential used to trigger an alarm. Such systems are unreliable in that they are apt to trigger a fire alarm upon slow changes in the ambient conditions and also under other conditions when such alarm is unwarranted, as in the case of smoke, smog and the like.

While in the present invention a pair of electric cells are also employed, they measure the conductivity of the gaseous environment, and their mode of operation is entirely different from that of the known devices. Both cells are open to the atmosphere and neither cell is closed, but one nevertheless operates as a reference cell which changes slowly with slowly changing ambient conditions. Therefore, such changes in the ambient as are produced by cigarette smoke, smog and the like, are not effective to trigger an alarm. The pair of cells are so constructed and arranged as to introduce a time base, or time differential, in the measurements of the conductivity of the volumes of atmosphere in the separate cells, although the measurements are made simultaneously. In effect the measured cell potentials are such as if measured at different time intervals. Comparison of the cell potentials, therefore, results in a voltage which is proportional to the rate of change of conductivity of the gaseous medium. Slowly changing ambient conditions affect both cells nearly alike and are in effect cancelled out of the readings. Rapidly changing ambient conditions, however, result in a larger difference in the measured conductivities and hence a larger difference in resulting potential. By addition of appropriate circuit elements, the change in the rate of change of the gaseous medium may be measured instead of the rate of change.

In light of the above brief explanation, it is a primary object of the present invention to provide improved methods and means for detecting a hazard.

It is another object of the invention to provide methods and means for detecting a hazard which are unresponsive to slow changes encountered in ambient conditions and thus prevent improper and undesired alarms.

It is a further object of the invention to provide improved processes and devices which operate to detect a rate of change, or a change in the rate of change of an environment subjected to a hazard.

It is still another object of the invention to provide simple methods and means for detecting hazards which are reliable, easy to perform and use, as well as economical in operation.

A still further object of the invention is to provide a sensitive and reliable fire alarm device which is actuated by incipient changes occurring in an environment.

Yet another object of the invention is to provide a method of indicating a hazard by causing a gaseous environmental medium to pass through a plurality of similar, or electrically equal, conductivity measuring cells, introducing a time delay in the measurement of one cell with respect to another, and comparing the resultant potentials of the cells to yield a potential proportional to the rate of change of conductivity of the gaseous medium under the influence of said hazard.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a diagram, in perspective and partially broken away, of a pair of cells connected to illustrate a preferred embodiment of the process and apparatus according to the invention;

FIG. 2 is a similar perspective diagram of another embodiment illustrating a second apparatus and method;

FIG. 3 is a sectional diagram illustrating a third apparatus and method;

FIG. 4 is a sectional diagram illustrating apparatus similar to that of FIG. 1 but modified to measure change in the rate of change;

FIG. 5 is a schematic circuit diagram illustrating a fire alarm utilizing apparatus similar to that of FIG. 1;

FIG. 6 is a plan view of a pair of conductivity cells constructed according to the invention; and FIG. 7 is a section taken on line 7—7 of FIG. 6 and looking in the direction of the arrows.

In the following explanation of the invention, it should be borne in mind that the volume of atmosphere, or other gas, being measured within each cell at any given time may comprise molecules, atoms, electrons, ions, protons, neutrons, neutrinos, and other elemental components whether electrically charged or uncharged, termed particles hereinafter, all having dynamic kinetic energy patterns. The number and nature of these particles, their movements, energy patterns, electric charge, etc. determine the electrical conductivity of the volume of gas within a cell. If each cell contains a pair of electrodes to which an ionization potential is applied, the potential in one cell being of comparable magnitude to that in the other, the movements of the myriad of minute, perfectly elastic particles, each of varying identity, velocity and potential, will cause the gasses in the two cells to conduct currents in accordance with their respective particle characteristics. If now one cell contains atmosphere whose kinetic energy, chemical content or electric potential has been modified by smoke, fumes, chemicals, radiation, conduction or any other hazard to a different extent than the other cell at a given time, or to the same extent at different times, the resultant conductivity measured by the cells will obviously differ. Therefore, by dividing a given volume of atmosphere into portions, and introducing a time differential into conductivity measurements of these portions, the slow changes caused by slowly rising humidity, cigarette smoke, smog and other nonhazardous influences will not unbalance the measured conductivities and not trigger an alarm, while other and real hazards involving a more rapid rate of change of conductivity will unbalance the measured conductivities and trigger the alarm.

Referring now more particularly to the drawings, FIGS. 1–3 illustrate diagrammatically three ways of effectively introducing a time delay, or time base, in the measurements of a plurality of conductivity cells according to the method for hazard detection of the present invention.

In FIG. 1, two conductivity measuring cells, A and B, are shown. These cells surround equal volumes of a gaseous medium or environmental atmosphere to be measured, but permit passage of the gas therethrough. Each cell includes a pair of identical electrodes 10 and 12. The electrodes may be wire grids, foraminous metal plates or the like. A tubular member 14 of insulating material and open at both ends, houses the cells properly spaced apart along its length so as to provide sequential, parallel plate, ionization chambers, or coaxial chambers in which an air stream 1 moves, or is caused to move. A positive potential is applied to the outer electrode 12 of cell B and an equal negative potential to the outer electrode 12 of cell A. The intermediate electrodes 10 are connected together and to the input 16 of a measurement device 18, or detector, whose output 20 may be used in a conventional way to trigger an alarm. Under the described conditions, where there is no change in the air stream 1 (no or little change in ambient conditions) the cells A and B measure equal conductivity of the air, and have equal output, by virtue of the cells being mechanically and electrically equal.

The equivalence of cells A and B is required for proper operation. If a radiating source is added to one, its equivalent must be added to the other to preserve balance in the circuit. Now, with a common gas stream both cells have substantially identical conductances, and the currents flowing through them are equal. In addition, by virtue of the sameness of the air stream the voltage drop across the cells is equal and the voltage on the common mode electrodes 10 connected to input 16 will be ½ the total voltage applied between the positive and negative electrodes 12. If these potentials are equal in magnitude the common mode point potential will be zero. If the gas stream 1 has a higher particle density than previously assumed, the potential will still be zero if both cells simultaneously see this environment.

If, however, a change occurs in the particle, ion, smoke or gas concentration such as to increase the conductivity of the air stream 1 as represented by the following arrow referenced 2, cell A will experience the change before cell B, and at time T1. The conductivity of cell A will increase, lowering the combined cell output voltage at 16 to a negative value. This situation will continue until a time T2 when the introduced change, i.e. stream 2, reaches cell B. When this occurs the potential at 16 will increase and return to zero, since both cells again see the same environment (stream 2) as described in the previous paragraph.

If, however, the perturbance continuously increases, i.e. the conductivity of stream 2 continually increases, the compared voltage output of the two cells at 16 will not return to zero but will remain at a voltage determined by ΔP (gas particle increase) divided by ΔT (time) or ΔP/ΔT, which is the rate of change of the gas particle increase. A decrease in gas particle density will result by similar logic in an increase of the voltage at point 16. The resultant voltage $E_1$ may, therefore, be expressed as $$E_1 = K \frac{d\phi}{dt}$$

where K is a constant and $\phi$ equals the particle concentration P.

Is is, therefore, possible by the selection of the spacing between the cells, the gas velocity and the cell sensitivity to control the combined cell output. The gas velocity selected may be ambient or natural convection currents, may be induced by venturi like conduits, or may be forced by a fan. By the above described means and the selection of proper time constants, the rate of increase of particle concentration which constitutes a hazard can be selected. Thus, by sequential sampling of a gas stream, i.e. changing relative location of the cells, a time base is introduced to obtain a measurement independent of slow or minute changes in the ambient air being monitored by the cells, which is very desirable in an effective fire detection system.

A second way of introducing a time base in the cell measurements is by parallel sampling of the environmental air stream in two electrically identical cells with different aerodynamic time constants. Such a cell arrangement is illustrated in FIG. 2. Cylindrical cell geometry is utilized for illustrative purposes. Cells C and D have identical geometries, and effective areas, being composed of cylindrical electrodes 22 and 24, respectively connected to equal negative and positive potentials and a common coaxial electrode 26 connected by lead 28 to a measuring device, not shown. Electrically the two cells are equivalent, having the same conductance when filled with air of equal particle density and/or smoke content. However, because of the greater number of holes 30 in cell C than cell D, air is allowed to pass radially through cell C at a higher rate. If now walls 32, 34 and 36 represent walls of ducts arranged to direct gases to and radially through the cells perpendicular to their axial electrode 26, a steady environment gas stream 1 of constant conductivity will pass through both cells simultaneously, but at different rates. As long as the cencentration of particles is not changing, the voltage of the common connection 28 is halfway between the positive and negative potentials applied to electrodes 22 and 28, or zero. When a perturbance or change in gas concentration occurs as in the following air stream 2, this change is effective earlier in cell C because of the larger number of holes 30 which permit the stream to pass more quickly. The voltage at point 28 will, therefore, go negative, assuming stream 2 has increased conductivity, until such time T2 as it takes for the gas of stream 2 to fill cell D at which time the potential at 28 returns to zero. Thus the action and measurements of cells C and D are the same as described for cells A and B of FIG. 1.

A third method of obtaining a time base is shown in FIG. 3. In this arrangement, cells E and F are electrically equal as are the cells described in FIGS. 1 and 2, and aerodynamically equal as are the cells in FIG. 1. However, a capacitor $C_1$ has been added between one electrode of cell E and ground, and another capacitor $C_2$, of different value, has been similarly added to cell F. In addition, resistors $R_1$ and $R_2$ have been inserted in series with the cells. As both cells are equal, their resistances are equal and voltages are equal and opposite at mid point 36 providing $R_1$ equals $R_2$, the air stream conductivity remains constant and there is no change in the ambient conditions, as represented by stream 1. However, where a change is introduced, as by the following stream 2, both cells change their conductivity and the voltages on the connected electrodes attempt to change. However, since $C_2$ does not equal $C_1$, current must flow to change the voltage of the electricity stored in the capacitors $C_1$ and $C_2$. If $C_1$ is greater than $C_2$, the time constant of charging ($C_1$, $R_1$) is greater than ($C_2$, $R_2$). The result is that the combined cell output at 36, the common mode point, departs from zero potential until $C_1$ and $C_2$ acquire the same voltage. If the gas particle concentration continually increases, output potential at 36 will not return to zero until the cell conductivity changes become insignificant by comparison with $R_1$, $R_2$. The important point is that a time base has been introduced to yield a $$\frac{d\phi}{dt}$$

or rate of change measurement, where $\phi$ is the atmospheric concentration of smoke, gas particles, etc.

In FIG. 4 is shown a modification which allows measurement of $$\frac{d^2\phi}{dt^2}$$

or change in the rate of change. Primarily the modification involves the insertion of a capacitor $C_3$ between the output 16 of the cells A and B and the input 17 to the grid of the electrometer tube 40. The input impedance $Zin$ of the tube connected circuit at 17 is preferably designed in the order of $10^{10}$ ohms, and the impedance of the cells preferably about $10^9$ ohms. The time constant $C_3 Zin$ may thus be adjusted to approximately 1 to 10 seconds with readily available components. Now if $E_1$, the voltage at point 16, is not changing, the combination of the tube current (ionization, leakage, etc.) will be balanced by the voltage imposed by the feedback circuit $R_3$, $R_4$ to yield zero output at $E_0$. Thus, with equilibrium of $E_1$, at whatever its value, $E_0$=zero, providing there is negligible leakage in the capacitor, i.e. the capacitor resistance is greater than $10^{11}$ ohms.

When $E_1$ increases, the increase will be coupled to the tube 40 resulting in an increase in the output potential, $E_0$. Thus, $E_0$ departs from zero only when $E_1$ changes and approximates $d(E_1)/dt$. It has been previously demonstrated in connection with the discussion of FIG. 1 that $E_1=Kd\phi/dt$, and therefore $E_0=Kd^2\phi/dt$, where $\phi$ is the atmospheric concentration of smoke, gas particles, etc. which are detected in the cells A and B. Thus the output potential $E_0$ varies to detect the presence of a hazard by the change in the rate of change.

In FIG. 5 is shown a schematic circuit of hazard detector cells according to the invention hooked up as a fire alarm circuit. As will be apparent at the left side of the diagram, the cells A and B are connected, in the manner previously described, to each other and to a source of power, preferably about 200 volts direct current, both positive and negative. Such power may be obtained in any conventional manner, as for example, by means of transformers, rectifiers and filter circuits. Each cell, A and B, may be surrounded by guard rings connected to each other and to the point of zero potential on resistor $R_3$. Alternatively as shown, a single guard ring 15 surrounds both cells and is connected to the adjusted zero potential point on $R_3$ at terminal 19. The common mode point of the cells is connected at 17 to the grid of control tube 40 which may be a triode and which is appropriately biased by resistor $R_4$. The cathode of tube 40 is connected through resistors $R_3$ and $R_5$ to ground. The cell electrodes 10 are connected through terminal 19 and resistor $R_7$ to the grid of triode 42. The alarm relay 45 is connected in the plate circuit of the latter tube and its contact 44 makes and breaks the alarm signal line which may obviously be connected to a signal lamp, an alarm horn or any other suitable electric alarm device.

Guard rings such as 15 neutralize the effects of changes in the outside influences in the charged particle environment that approach the assembly of cells from any other direction except that of the upward gaseous flow through the meshed electrode barriers by maintaining the circuit to the grid of the electrometer tube and common electrode at the same potential.

It is apparent from FIG. 5 that if the hazard sensor cells, A and B, are suitably proportioned geometrically and properly related to the bias on the grid of tube 40 that said tube will draw current in the cathode and plate circuits until a hazard condition is signaled by a decrease in the voltage at point 17 sufficient to cut off the tube. When such voltage is signaled through resistor $R_7$, tube 42 will also cut off. The sensitivity of the latter tube is adjustable, by means of potentiometer $R_8$ in its cathode circuit, so that upon an appropriate input signal to tube 42, relay 45 deenergizes to close contact 44 and signal the alarm. If any component fails, such as tubes 40, 42 or relay 45, the alarm will signal. By reversing the potentials on cell electrode 12 only, the tube 40, 42 can be made to fire on increase of potential at terminal 17. In such instance the relay contact would open to signal an alarm.

The conductivity cells may obviously take many different forms of construction. One suitable pair of cells is structurally illustrated in FIGS. 6 and 7. Three similar, horizontally disposed meshed electrodes 50 are stacked and separated by flat panels 52 of insulating material. At the top and bottom, cover plates 54, also of insulating material, are applied to the stack. The separators and the cover plates are formed with aligned circular openings 56 permitting the entrance of the air, atmosphere or gas to be monitored. Bolts 58 pass through the assemblage of electrodes and insulators to form a flat sandwich and a unified cell package in which the air to be tested passes through the openings in the mesh screens 50 and through the openings 56 in the cover plates and separators. The center electrode 50 is common to the two cells formed and is provided with a terminal 60. The outer electrodes 50 are provided with terminals 62 and 64 for connection to positive and negative potentials.

A device constructed as above described is in essence a cylindrical container whose interior is defined by the openings 56 traversed by perforated electrodes 50 and through which a sample of the gas to be monitored can be passed sequentially by natural or forced convection. A cell so constructed has yielded a potential as high as 75 volts on the center electrode terminal 60, during the incipient stages of a fire in the same room, when 200 volts, positive and negative, were connected to the upper and lower electrode terminals 62 and 64.

Obviously the three electrodes 50 and additional ones may be constructed of different size mesh, in which case the aerodynamic time constants of the cells defined by the meshes may be made radically different to introduce a desired time base in the measurements. Desirably the reference cell should have a much longer time constant than the other cells and should differ by a minimum of one order of magnitude. The geometries of the cells, their arrangements and disposition to obtain such can be legion.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. An instrument for determining a hazard by incipient change in a gaseous environmental medium comprising a tubular member open at both ends and defining a passage, means to cause flow of the gaseous medium through said passage, a first pair of spaced foraminated electrodes traversing the passage within the member, a second pair of identically spaced foraminated electrodes traversing said passage and spaced from the first pair, each of said electrodes being identical in size and shape including the size, number and disposition of the openings therein, means for applying a positive potential to one electrode of one of said pairs, means for applying an equal negative potential to one electrode of the other of said pairs, and the other electrode of each pair being connected to each other and to an electrical measuring device, whereby the resultant reading on said device of simultaneous compared measurements of conductance of the gaseous medium in the equal volumes enclosed by said first and second pairs of electrodes is proportional to the rate of change of conductivity due to the slight time differential in passage of a portion of the gaseous medium from one pair of electrodes to the other.

2. Apparatus for electrically determining a hazard by incipient changes in an environmental medium, comprising means for causing a stream of ambient air to pass through a pair of electrical conductivity cells in sequence, the cells of said pair being identical and having equal electrical potentials applied thereto, means for simultaneously measuring the electrical conductivity of the air in each cell, and means for comparing the measured conductivities with a slight time differential resulting from the sequential passage of the air stream to determine the rate of change of conductivity of the ambient air.

3. Apparatus for electrically determining a hazard by incipient changes in an environmental medium, comprising means for causing portions of ambient air to pass through a pair of electrical conductivity cells, the cells of said pair being identical and having equal electrical potentials applied thereto, means for causing the air portion passing through one cell to move at a flow rate different from that of the air portion passing through the other cell, means for simultaneously measuring the conductivity in each cell, and means for comparing the measured conductivities to determine the rate of change of conductivity of the ambient air.

4. In an apparatus for determining a hazard by incipient canges in a gaseous environmental medium, the combination of means for causing a stream of a gaseous medium to move through an electrical conductivity measuring cell, means for causing a portion of said gaseous medium to move through a second and substantially identical conductivity measuring cell having equal electrical potentials applied thereto, means for measuring the electrical conductivities of said gaseous medium and portion in said cells, and means for comparing the measured conductivities in said cells with a slight time differential to yield a resultant voltage proportional to the rate of change of conductivity of the gaseous medium.

5. Apparatus according to the combination claimed in claim 4 wherein is added means for applying said voltages proportional to the rate of change of conductivity of the gaseous medium to an alarm device through an electricity storage element, whereby to provide a voltage proportional to the change in rate of change of conductivity of the gaseous medium.

6. The combination according to claim 4 wherein said mean for comparing the measured electrical conductivities in said cells includes a pair of circuits having electricity storage elements of differing capacity, each of said circuits being connected to one of said cells, whereby the differing time constants of said pair of circuits delays changes of potential on the electrodes of said cells at different rates to introduce said slight time differential.

7. The combination according to claim 4 wherein said means for causing a portion of said gaseous medium to move through the second cell includes means for moving said portion at a different aerodynamic rate of flow than said stream of gaseous medium moving through the first cell.

8. In an apparatus for determining a hazard by measuring the rate of change of conductivity of a gaseous environmental medium, the combination of means for causing a stream of a gaseous medium to move sequentially through a plurality of electrical conductivity measuring cells, each of said cells having substantially the same physical and electrical characteristics and each containing a pair of electrodes, the pair of electrodes of one cell having a potential applied thereto equal and opposite to that applied to the pair of electrodes of the other cell, means for simultaneously measuring the electrical conductivity of said medium in said cells, and means for comparing the measured conductivities in said cells, whereby the time differential introduced by sequential passage of the medium yields a resultant voltage proportional to the rate of change of conductivity.

9. In an instrument for determining a hazard by incipient changes in a gaseous environmental medium, the combination of a pair of electrical conductivity cells of substantially equal volume and equal electrical characteristics, said cells comprising a tubular body of metal defining an electrode to both cells, a metal member constituting a second and common electrode to both cells and located in the axis of said tubular body, insulating walls closing the ends of said tubular body, and an insulating partition traversing said body at its center to divide the space within the body into two equal cells, said tubular body being provided with a plurality of apertures to permit entrance within and exit of a gaseous medium, the number of apertures on one side of the central partition differing from the number on the other.

10. In an instrument the combination according to claim 9 wherein is additionally provided an alarm indicating device connected to said second and common electrode.

References Cited by the Examiner

UNITED STATES PATENTS

| | | | |
|---|---|---|---|
| 2,632,326 | 3/1953 | Stuart | 250—83.6 X |
| 2,761,976 | 9/1956 | Obermaier | 250—83.6 X |
| 2,763,790 | 9/1956 | Ohmart | 250—83.4 |
| 2,829,274 | 4/1958 | Schreck | 250—83.6 X |
| 2,851,654 | 9/1958 | Haddad | 324—30 |
| 2,920,208 | 1/1960 | Crump | 250—83.6 |
| 2,957,084 | 10/1960 | Marr et al. | 250—83.6 |
| 3,041,591 | 6/1962 | Moore | 340—237 |

FOREIGN PATENTS

| | | |
|---|---|---|
| 675,030 | 7/1952 | Great Britain. |

NEIL C. READ, *Primary Examiner.*

D. K. MYER, *Assistant Examiner.*